United States Patent
Gronvall et al.

(10) Patent No.: US 11,705,980 B2
(45) Date of Patent: *Jul. 18, 2023

(54) CABLE ARRANGEMENT WITH WAVELENGTH DIVISION MULTIPLEXER

(71) Applicant: CommScope Technologies LLC, Hickory, NC (US)

(72) Inventors: Erik J. Gronvall, Bloomington, MN (US); Trevor D. Smith, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/321,983

(22) Filed: May 17, 2021

(65) Prior Publication Data

US 2021/0409143 A1 Dec. 30, 2021

Related U.S. Application Data

(63) Continuation of application No. 16/785,981, filed on Feb. 10, 2020, now Pat. No. 11,012,176, which is a
(Continued)

(51) Int. Cl.
*H04B 10/2575* (2013.01)
*G02B 6/28* (2006.01)
(Continued)

(52) U.S. Cl.
CPC ........ *H04J 14/0246* (2013.01); *G02B 6/2804* (2013.01); *G02B 6/3807* (2013.01);
(Continued)

(58) Field of Classification Search
CPC . H04J 14/0246; G02B 6/4452; G02B 6/3807; G02B 6/2804; H04Q 11/0067; H04B 10/25758
See application file for complete search history.

(56) References Cited

U.S. PATENT DOCUMENTS 7,113,679 B2   9/2006  Melton et al.
7,292,763 B2   11/2007 Mertesdorf et al.
(Continued)

FOREIGN PATENT DOCUMENTS

WO    02/099528 A1    12/2002
WO    2011/051930 A1   5/2011
WO    2015/009825 A1   1/2015

OTHER PUBLICATIONS

International Search Report and Written Opinion of the International Searching Authority for corresponding International Patent Application No. PCT/US2016/019621 dated Jun. 29, 2016, 10 pages.
(Continued)

*Primary Examiner* — Omar S Ismail
(74) *Attorney, Agent, or Firm* — Merchant & Gould P.C.

(57) ABSTRACT

A passive optical network includes a central office providing subscriber signals; a drop terminal; and a wave division multiplexer. A fiber distribution hub may split or separate out dedicated optical signals from subscriber optical signals between the central office and the drop terminal. The wave division multiplexer separates dedicated optical signals pertaining to a specific dedicated subscriber from other optical signals on the line received at the wave division multiplexer. The wave division multiplexer may be part of a cable or part of an intermediate service terminal.

20 Claims, 10 Drawing Sheets

Related U.S. Application Data continuation of application No. 15/553,441, filed as application No. PCT/US2016/019621 on Feb. 25, 2016, now Pat. No. 10,560,211.

(60) Provisional application No. 62/121,345, filed on Feb. 26, 2015.

(51) Int. Cl.
*G02B 6/38* (2006.01)
*G02B 6/44* (2006.01)
*H04J 14/02* (2006.01)
*H04Q 11/00* (2006.01)

(52) U.S. Cl.
CPC ....... *G02B 6/4452* (2013.01); *H04B 10/2575* (2013.01); *H04B 10/25758* (2013.01); *H04Q 11/0067* (2013.01)

(56) References Cited

U.S. PATENT DOCUMENTS

| | | | |
|---|---|---|---|
| 7,489,849 B2 | 2/2009 | Reagan et al. | |
| 7,744,288 B2 | 6/2010 | Lu et al. | |
| 8,532,490 B2 | 9/2013 | Smith et al. | |
| 8,670,667 B1* | 3/2014 | Sandstrom | H04J 14/0239 398/71 |
| 8,837,940 B2 | 9/2014 | Smith et al. | |
| 8,961,035 B2 | 2/2015 | Leblanc et al. | |
| 9,078,287 B2 | 7/2015 | Khemakhem et al. | |
| 9,438,513 B2 | 9/2016 | Gronvall et al. | |
| 9,739,945 B2 | 8/2017 | Dowling | |
| 2006/0093303 A1* | 5/2006 | Reagan | G02B 6/4457 385/76 |
| 2009/0317047 A1 | 12/2009 | Smith et al. | |
| 2010/0092129 A1 | 4/2010 | Conner | |
| 2010/0092171 A1 | 4/2010 | Conner | |
| 2010/0316390 A1 | 12/2010 | Almog | |
| 2011/0311226 A1* | 12/2011 | Smith | H04B 10/25753 398/45 |
| 2012/0128311 A1 | 5/2012 | Bolster et al. | |
| 2013/0095875 A1* | 4/2013 | Reuven | H04B 7/10 455/507 |
| 2013/0216187 A1* | 8/2013 | Dowling | G02B 6/262 385/71 |
| 2014/0105539 A1* | 4/2014 | Conner | G02B 6/4471 385/24 |
| 2014/0226976 A1* | 8/2014 | Britz | H04Q 11/0067 398/25 |
| 2014/0254986 A1* | 9/2014 | Kmit | G02B 6/4285 385/55 |
| 2014/0321813 A1 | 10/2014 | Lu | |
| 2015/0192741 A1* | 7/2015 | Dowling | G02B 6/262 385/135 |

OTHER PUBLICATIONS

Extended European Search Report for corresponding European Patent Application No. 16756386.5 dated Sep. 17, 2018, 9 pages.

* cited by examiner

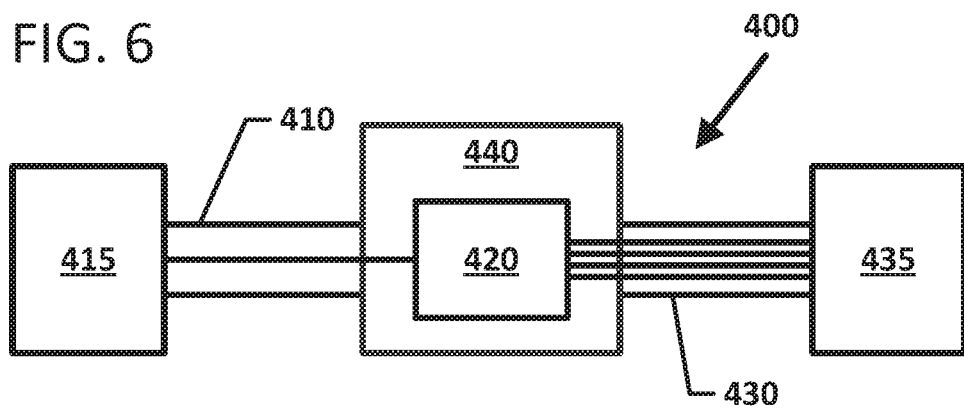
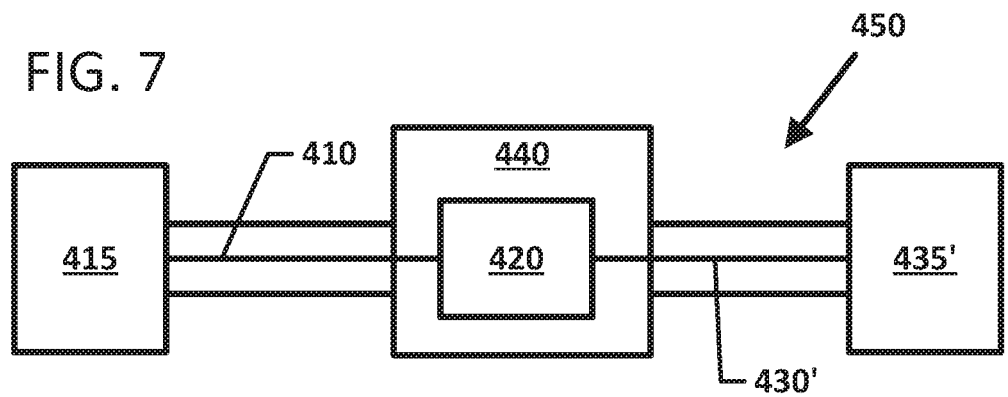
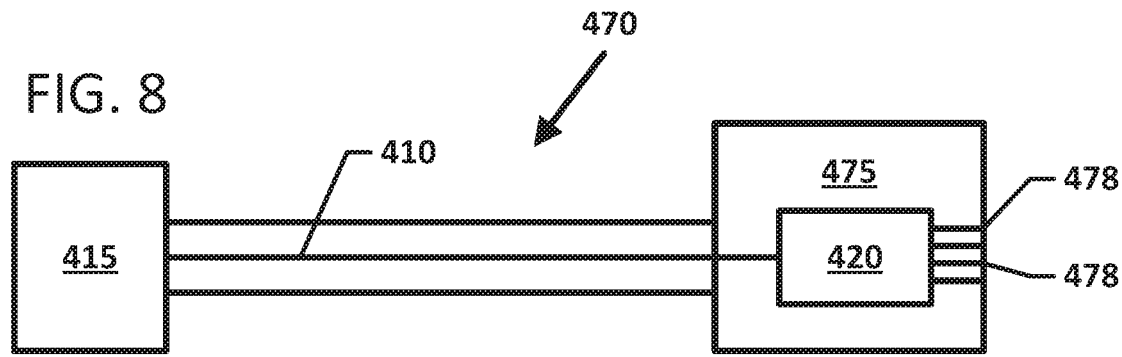

CABLE ARRANGEMENT WITH WAVELENGTH DIVISION MULTIPLEXER

CROSS-REFERENCE TO RELATED APPLICATION

This application is a Continuation of U.S. patent application Ser. No. 16/785,981, filed on Feb. 10, 2020, now U.S. Pat. No. 11,012,176, which is a Continuation of U.S. patent application Ser. No. 15/553,441, filed on Aug. 24, 2017, now U.S. Pat. No. 10,560,211, which is a National Stage Application of PCT/US2016/019621, filed on Feb. 25, 2016 which claims the benefit of U.S. Patent Application Ser. No. 62/121,345, filed on Feb. 26, 2015, the disclosures of which are incorporated herein by reference in their entireties. To the extent appropriate, a claim of priority is made to each of the above disclosed applications.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks, and fiber-to-the-premises (FTTP) networks.

FTTN and FTTC networks use fiber optic cables that are run from a service provider's central office to a cabinet serving a neighborhood. Subscribers connect to the cabinet using traditional copper cable technology, such as coaxial cable or twisted pair wiring. The difference between an FTTN network and an FTTC network relates to the area served by the cabinet. Typically, FTTC networks have cabinets closer to the subscribers that serve a smaller subscriber area than the cabinets of FTTN networks.

In an FTTP network, fiber optic cables are run from a service provider's central office all the way to the subscribers' premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in or on a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with each subscriber's devices. Of course, to the extent that subscribers have devices that are compatible with optical signals, conversion of the optical signal to an electrical signal may not be necessary.

FTTP networks include active optical networks and passive optical networks. Active optical networks use electrically powered equipment (e.g., a switch, a router, a multiplexer, or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

FIG. 1 illustrates a FTTP network 100 deploying passive fiber optic lines. As shown, the network 100 can include a central office 101 that connects a number of end subscribers 105 in a network. The central office 101 can additionally connect to a larger network, such as the Internet (not shown) and a public switched telephone network (PSTN). The various lines of the network 100 can be aerial or housed within underground conduits.

The network 100 also can include fiber distribution hubs (FDHs) 103 having one or more optical splitters (e.g., 1-to-8 splitters, 1-to-16 splitters, or 1-to-32 splitters) that generate a number of distribution fibers that may lead to the premises of an end user 105. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The F2 portion of the network 100 includes distribution cables routed from the FDH 103 to subscriber locations 105. For example, the distribution cables can include break-out locations 102 at which branch cables are separated out from the main distribution lines. Branch cables are often connected to drop terminals 104 that include connector interfaces for facilitating coupling of the fibers of the branch cables to a plurality of different subscriber locations 105 (e.g., homes, businesses, or buildings). For example, fiber optic drop cables can be routed directly from a breakout location 102 on the distribution cable to an ONT at a subscriber location 105. Alternatively, a stub cable can be routed from a breakout location of the distribution cable to a drop terminal 104. Drop cables can be run from the drop terminal 104 to ONT's located at premises 105 located near the drop terminal 104.

Distributed Antenna Systems (DAS) also are becoming more prevalent. DAS are used to provide wireless service (e.g., cell phone, WIFI, etc.) within a given geographic area. DAS include a network of spaced-apart antenna nodes optically or electrically connected to a common control location (e.g., a base station). Each antenna node typically includes an antenna and a remote unit (i.e., a radio head, a remote transceiver, etc.).

DAS enable a wireless cellular service provider to improve the coverage provided by a given base station or group of base stations. In DAS, radio frequency (RF) signals are communicated between a host unit and one or more remote units. The host unit can be communicatively coupled to one or more base stations directly by connecting the host unit to the base station using, for example, electrical or fiber telecommunications cabling. The host unit can also be communicatively coupled to one or more base stations wirelessly, for example, using a donor antenna and a bi-directional amplifier (BDA). One or more intermediate devices (also referred to here as "expansion hubs" or "expansion units") can be placed between the host unit and the remote units in order to increase the number of remote units that a single host unit can feed and/or to increase the hub-unit-to-remote-unit distance.

RF signals transmitted from the base station (also referred to here as "downlink RF signals") are received at the host unit. The host unit uses the downlink RF signals to generate a downlink transport signal that is distributed to one or more of the remote units. Each such remote unit receives the downlink transport signal and reconstructs the downlink RF signals based on the downlink transport signal and causes the reconstructed downlink RF signals to be radiated from at least one antenna coupled to or included in that remote unit.

A similar process is performed in the uplink direction. RF signals transmitted from mobile units (also referred to here as "uplink RF signals") are received at each remote unit. Each remote unit uses the uplink RF signals to generate an uplink transport signal that is transmitted from the remote unit to the host unit. The host unit receives and combines the uplink transport signals transmitted from the remote units. The host unit reconstructs the uplink RF signals received at the remote units and communicates the reconstructed uplink RF signals to the base station. In this way, the coverage of the base station can be expanded using the DAS.

One general type of DAS is configured to use optical fibers to communicatively couple the host unit to the remote units and/or expansions hubs. However, such a fiber-optic DAS typically makes use of dedicated optical fibers that are deployed specifically to support that DAS.

SUMMARY

Features of the present disclosure relate to methods and systems for efficiently and cost effectively distributing fiber optic communications services to a local area while concurrently supporting a dedicated optical signal distribution system (e.g., a DAS network, a small cell network, a security monitoring network).

Aspects of the disclosure are related to a passive optical network including a fiber distribution hub, which receives both subscriber optical signals and dedicated optical signals, and a drop terminal, which receives both signals from the fiber distribution hub. The drop terminal outputs the subscriber signals at one or more ports and outputs the dedicated signals at one or more other ports.

Subscriber optical signals include optical signals provided to a number of end users (e.g., to residences, multi-dwelling units, and businesses). In some implementations, subscriber optical signals are time-slotted. In some implementations, the subscriber signals are not broadcast over a wavelength or wavelength range dedicated to a specific subscriber.

Dedicated optical signals include optical signals provided to specific subscribers over respective dedicated wavelengths or wavelength ranges. In some implementations, dedicated optical signals are not time-slotted. In some implementations, the dedicated optical signals are broadcast over only part of the wavelength ranges utilized by the network. Examples of dedicated optical signals include optical signals pertaining to small cell networks, DAS signals, and video signals for cameras (e.g., security cameras).

Other aspects of the disclosure are directed to a cable arrangement including a first optical connector terminating a first end of the cable arrangement; a second optical connector terminating a second end of the cable arrangement, the second end being opposite the first end; and a wavelength division multiplexer configured to multiplex and demultiplex optical signals carried between the first optical connector and the second optical connector based on wavelengths of the optical signals.

In certain implementations, the cable arrangement can be used to separate the dedicated signals from the subscriber signals. In certain implementations, the cable arrangement can be used to separate one dedicated signal from other dedicated optical signals carried by the same line.

Other aspects of the disclosure are directed to a fiber distribution hub including a cabinet defining an interior; a termination field disposed within the cabinet; a first optical power splitter disposed within the cabinet; a second optical power splitter disposed within the cabinet, the second optical power splitter having a lower split ratio than the first optical power splitter; and a wavelength division multiplexer disposed within the cabinet, the wave division multiplexer being configured to receive both subscriber optical signals and antenna optical signals, the wave division multiplexer passing the subscriber optical signals to the first optical power splitter and passing the antenna optical signals to the second optical power splitter.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 6 is a schematic diagram of an example cable arrangement extending between a ruggedized single fiber connector and a ruggedized multi-fiber connector and including a WDM;

FIG. 7 is a schematic diagram of an example cable arrangement extending between two ruggedized single fiber connectors and including a WDM;

FIG. 8 is a schematic diagram of an example cable arrangement extending between a ruggedized single-fiber connector and a multi-fiber connector that includes a WDM;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
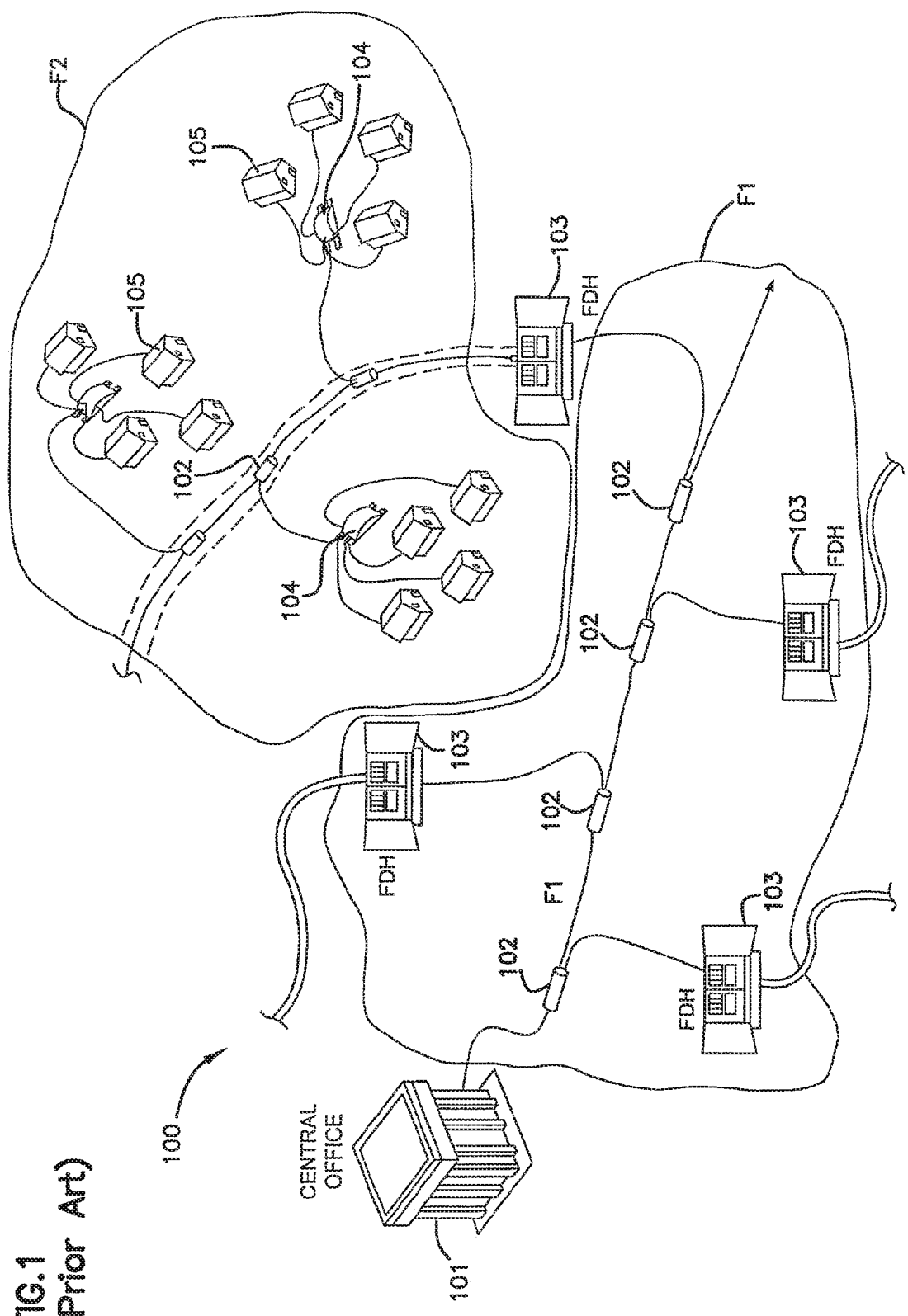
FIG. 1 is a schematic diagram of an FTTP network deploying passive fiber optic lines.

An aspect of the present disclosure relates to a fiber optic network including at least one fiber distribution hub (FDH) and a plurality of drop terminals (i.e., multi-service terminals) that are optically connected to the FDH by optical distribution cables. The fiber optic network can be used to connect end subscribers (e.g., subscribers 105 of FIG. 1) to a central office (e.g., central office 101 of FIG. 1). Remote radio heads of a Distributed Antenna System (DAS), security cameras, or other data intensive equipment also can be connected to the fiber optic network.

For example, a first feeder cable can be used to connect a first signal source (e.g., at a central office) to an FDH; drop cables can be used to connect the subscriber locations to the drop terminals; and distribution cables can be used to connect the drop terminals to the FDH to provide a first type of service. A second feeder cable can be used to connect a second signal source (e.g., at a base station) to the FDH; drop cables can be used to connect the antenna nodes to the drop terminals; and the distribution cables connect the drop terminals to the FDH to provide a second type of service. In certain implementations, the antenna nodes and the second source can be retrofitted to an existing optical network. In some such implementations, one or more of the same components (e.g., FDH, distribution cables, drop terminals) can be used for both types of services.

Figure 2:
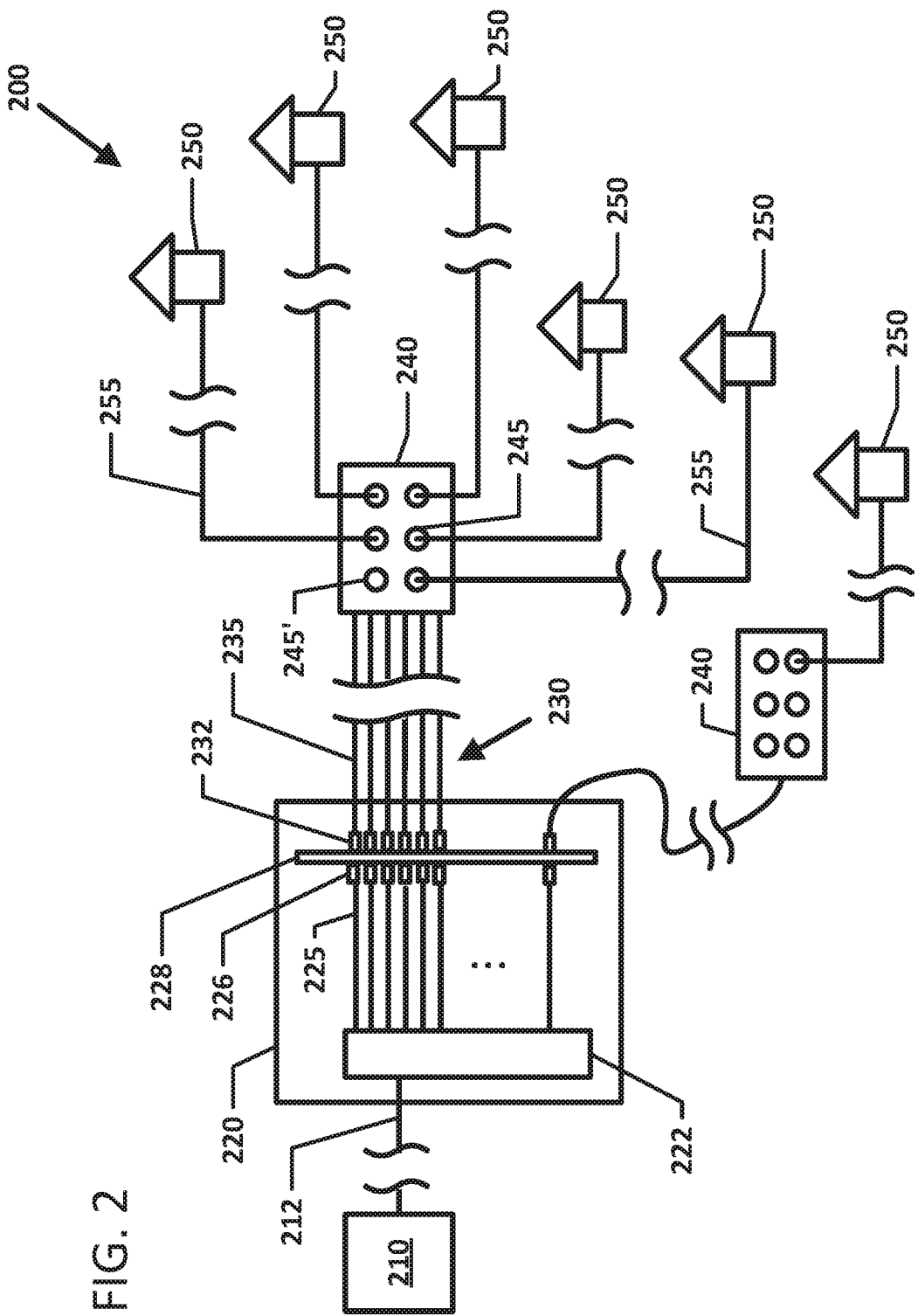
FIG. 2 is a schematic diagram of an FTTP network including a drop terminal and FDH.

FIG. 2 is a schematic diagram of an example optical network 200 that connects a first signal source (e.g., a central office) 210 to end subscribers 250. A first feeder cable 212 connects the first signal source 210 to an FDH 220. One or more fibers (e.g., single-mode fibers) of the first feeder cable 212 are routed to a passive optical splitter 222, which splits signals carried over the feeder cable 212 onto splitter pigtails 225. The splitter pigtails 225 are optically coupled to fibers 235 of a distribution cable 230, which are routed out of the FDH 220. For example, within the FDH 220, connectorized ends 226 of the splitter pigtails 225 can be routed to a termination field 228 at which they are optically coupled to connectorized ends 232 of the distribution fibers 235.

The splitter 222 includes at least one passive optical power splitter. Passive optical power splitters (e.g., 1 to 8 splitters, 1 to 16 splitters, 1 to 32 splitters, 1 to 64 splitters, etc.) split signals from one to many and combine signals from many to one without providing any wavelength filtration. In the case of a 1 to 8 splitter, each of the split signals has $\frac{1}{8}^{th}$ the power of the input signal.

The distribution cable 230 is routed from the FDH 220 to at least one drop terminal 240. The fibers 235 of the distribution cable 230 are optically coupled to output ports 245 of the drop terminal 240. Drop cables 255 extend between the output ports 245 of the drop terminal 240 and the end subscribers 250. For example, each drop cable 255 can connect one of the end subscribers (e.g., a house, a business, a building, etc.) to one of the drop terminal ports 245. In some implementations, the drop terminal 240 has between two and sixteen ports 245. In certain implementations, the drop terminal 240 has between four and twelve ports 245. In an example, the drop terminal has six ports 245. In an example, the drop terminal has eight ports 245.

In some implementations, a drop terminal 240 may have one or more empty ports 245' that are not connected to subscribers 250. If a new subscriber joins the network (i.e., requests the first type of service), then a drop cable 255 can be plugged into one of the empty ports 245' to extend service to the subscriber 250. Of course, a drop terminal port 245 may become empty be disconnecting or adjusting the connection of an existing subscriber 250.

According to some aspects of the disclosure, one or more subscribers 250 can request a dedicated optical signal carried over a wavelength or wavelength range dedicated to the requesting subscriber. In examples, the dedicated signals can be routed to antennas, cameras, video monitors, or other devices requiring relatively uninterrupted streams of data. In some implementations, the dedicated optical signals are carried over the same input fiber 212 as the subscriber optical signals. In certain implementations, the dedicated optical signals are split by the same optical power splitter(s) 222 as the subscriber optical signals. In certain implementations, the dedicated optical signals are provided to the same drop terminals 240 as the subscriber optical signals. In certain implementations, the dedicated optical signals are provided to the same ports 245, 245' of the drop terminal(s) 240 as the subscriber optical signals.

In certain implementations, a wave division multiplexer (e.g., a coarse wave divisional multiplexer) is provided downstream of the fiber distribution hub 220 to separate out the dedicated optical signals. In some implementations, the wave division multiplexer forms part of a cable arrangement as will be discussed in more detail herein with respect to FIGS. 4-8. In other implementations, the wave division multiplexer is disposed within an intermediate terminal located between the drop terminal and the subscriber requesting the dedicated signal.

Figure 3:
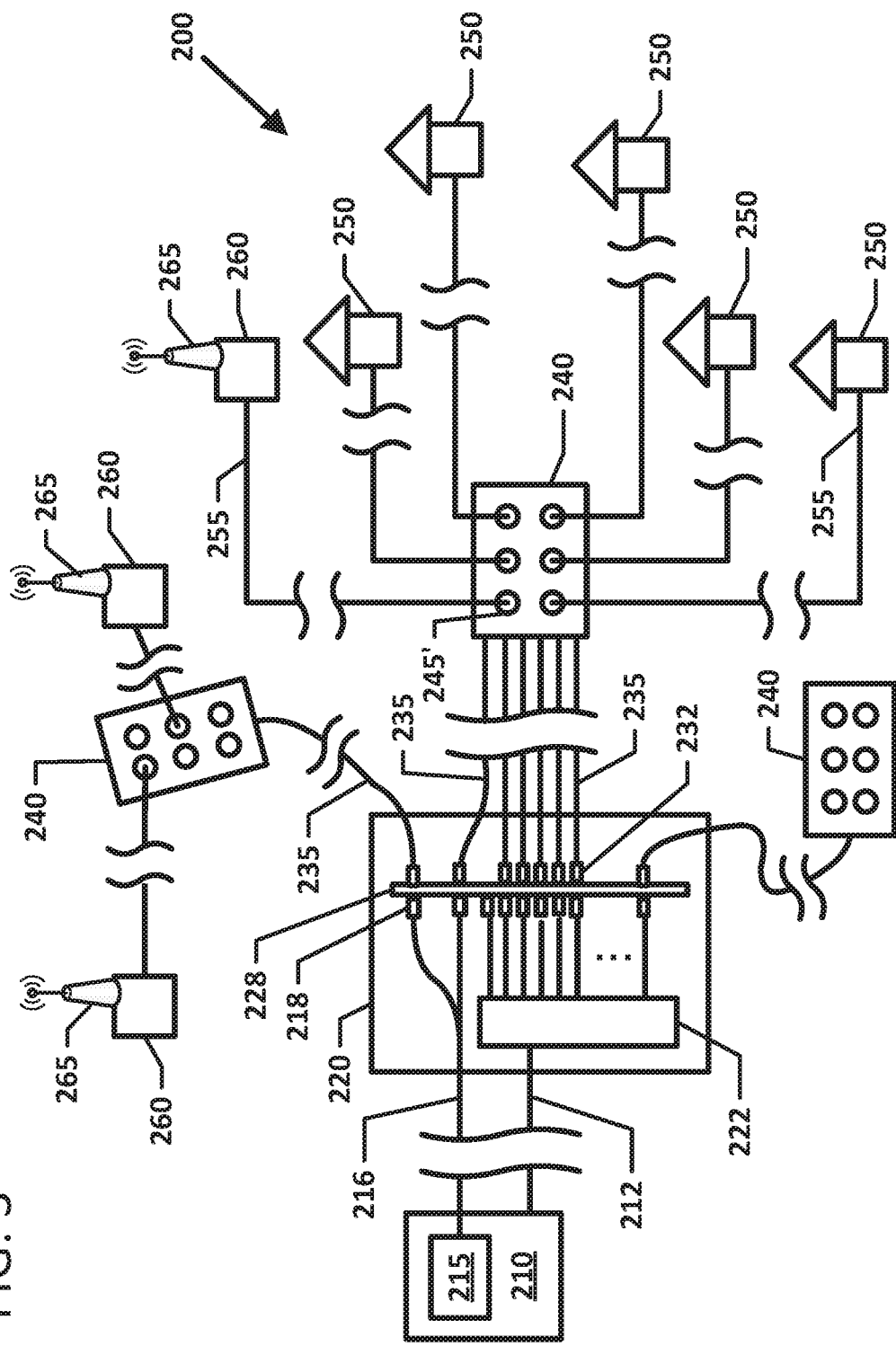
FIG. 3 is a schematic diagram of the FTTP network of FIG. 2 with a base station and remote unit retrofitted to the network.

According to some aspects of the disclosure, the dedicated signals can be provided to the network on a different input line from the subscriber signals. For example, as shown in FIG. 3, a fiber distribution hub 220 can receive a first feeder cable 212, which carries the subscriber signals, and a second feeder cable 216, which carries the dedicated signals. The dedicated signals may be split at one or more optical power splitters within the fiber distribution hub 220. In certain implementations, the dedicated signals are split at a different power splitter than the subscriber signals.

FIG. 3 illustrates one example system including general subscribers and dedicated subscribers. For ease in understanding, the dedicated subscribers will be described herein as remote units of a DAS. It will be understood from this disclosure, however, that other types of data intensive equipment (e.g., a security camera, a small cell node, etc.) can be used in place of or in addition to the DAS remote units.

In FIG. 3, the dedicated optical signals can be provided to the remote units. For example, one or more of the remote units (e.g., remote radio heads) 260 can be connected to one of the empty drop terminal ports 245'. The empty port 245' can be connected to a second signal source 215 via a second feeder cable 216 at the FDH 220. The second signal source 215 includes one or more lasers capable of transmitting beams of light over narrow bands with narrow gaps between the bands. Each remote unit 260 includes an antenna 265 for wirelessly broadcasting the optical signals carried over the second feeder cable 216.

In some implementations, the base station 215 is located within the central office 210 (e.g., see FIG. 3). In other implementations, the base station 215 can be located remote from the central office 210. The base station 215 includes active electrical components for managing the various signals fed back and forth between the antenna nodes 265 and the base station 260. For example, the base station 215 can include a plurality of transceivers for receiving and transmitting signals and a power amplifier for amplifying the signals. The base station 215 can be configured for any one or more telecommunications standards including 3G (e.g., GSM, EDGE, UMTS, CDMA, DECT, WiMAX, etc.), LTE, and 4G. In one embodiment, the base station 215 includes optical multiplexers (e.g., wavelength division multiplexers) to join signal into a multiplexed signal transmitted through the second feeder cable 216 to the FDH 220 and to separate the multiplexed signal received from the FDH 220 into separate signals to be carried back over the second feeder cable 216.

At the FDH 220, one or more connectorized ends 218 of the second feeder cable 216 can be plugged into the termination field 228. In certain implementations, the second feeder cable 216 is not split before being plugged into the termination field 228 (i.e., the optical signals carried by the second feeder are not passed through an optical power splitter). The connectorized end of a distribution fiber 235 routed to an empty drop terminal port 245' can be optically coupled to the second feeder connectorized end 218 at the termination field 228 (see FIG. 3). Accordingly, the empty port 245' receives the optical signals (e.g., the multiplexed optical signal) carried over the second feeder 216 from the base station 215.

At the drop terminal 240, a drop cable 255 can be plugged into an empty port 245'. When plugged in, the drop cable 255 receives the multiplexed signal carried over the distribution fiber 235 coupled to the second feeder cable 216. An opposite end of the drop cable 255 is coupled to the remote unit 260. In certain implementations, the drop cable 255 is ruggedized (e.g., enclosed and/or sealed against environmental contamination). In certain implementations, multiple remote units 260 can connect to one drop terminal 240 with respective drop cables 255 (e.g., see the top drop terminal 240 shown in FIG. 3). In certain implementations, signals from the second feeder 216 are provided to multiple drop terminals 240 (e.g., see FIG. 3). For example, certain types of second feeders 216 can include multiple feeder fibers.

Of course, in other examples, a security camera, small cell node, or other data intensive equipment can be used in addition to or in place of the DAS remote units.

Figure 4:
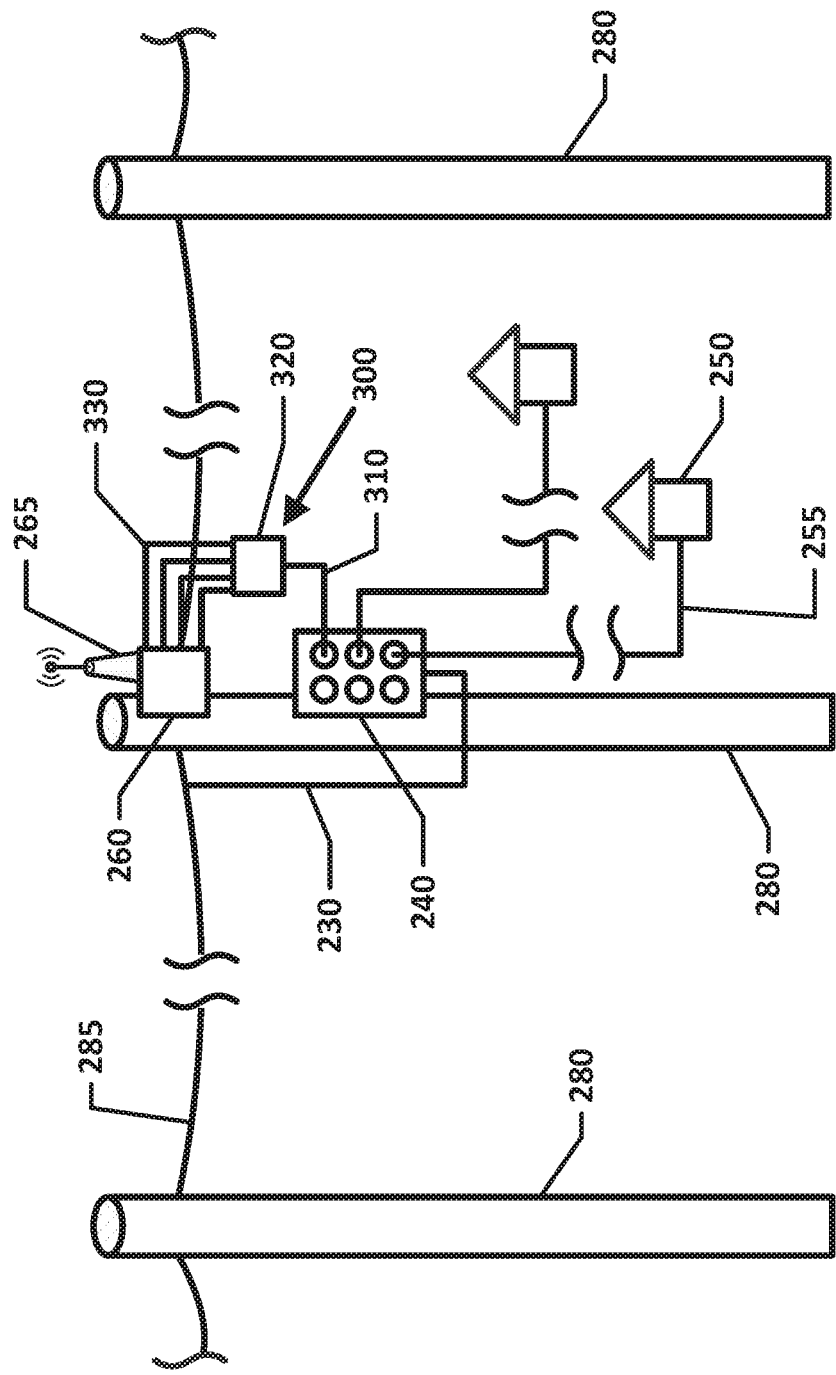
FIG. 4 illustrates the drop terminal and remote unit of FIG. 3 mounted to a pole in the field.

FIG. 4 shows one example drop terminal 240 deployed in the field. In the example shown, the drop terminal 240 is mounted to one of a plurality of poles 280 (e.g., telephone pole, light pole, etc.). Various cables 285 (e.g., power cables, other optical cables, etc.) are routed between the poles 280. The routed cables 285 include the distribution cable 230. In some implementations, a connectorized end of a distribution cable 230 is plugged into an input port of the drop terminal 240. In other implementations, the distribution cable 235 includes a connectorized input stub of the drop terminal 240 routed along the poles 280 (and/or through underground conduits) to the FDH 220. In some implementations, one or more drop cables 255 can be routed from the drop terminal 240 to end subscribers 250.

In the example shown, an outdoor remote unit 260 also is mounted to the pole 280. In other implementations, however, the remote unit 260 can be mounted to a different pole 280 or at a different location adjacent the pole 280. In still other implementations, the remote unit 260 can be mounted to the pole 280 and the drop terminal 240 can be mounted to an adjacent location. In some implementations, a drop cable 255 can be routed between the empty port 245 and the remote unit 260. In other implementations, the remote unit 260 can be connected to the empty port 245' using a cable arrangement 300 (FIG. 4) that multiplexes and demultiplexes the optical signals passed between the port 245 and the remote unit 260. In other implementations, another type of data intensive equipment (e.g., a security camera) can be mounted to the pole 280 and receive the drop cable 255.

Figure 5:
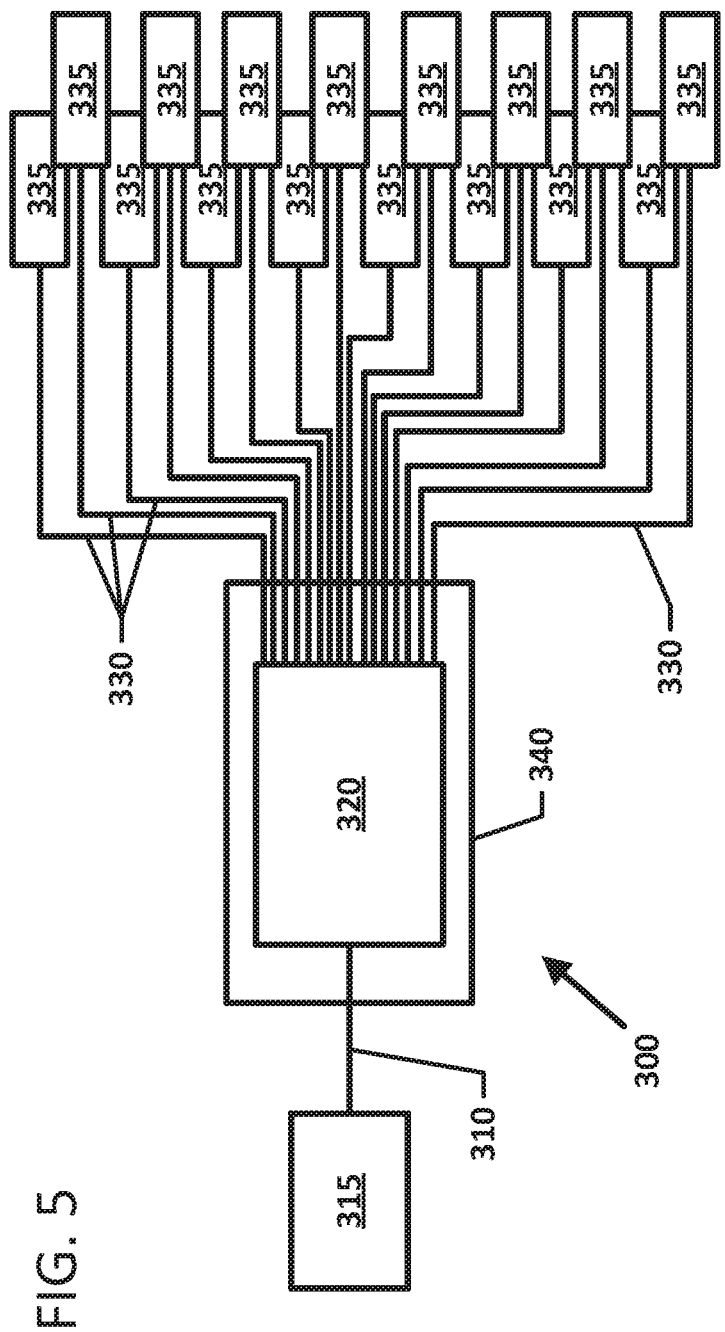
FIG. 5 is a schematic diagram of a cable arrangement suitable for connecting the drop terminal and the remote unit of FIGS. 3 and 4.

FIG. 5 illustrates one example cable arrangement 300 suitable for use in connecting a remote unit 260 to a drop terminal 240. The cable arrangement 300 includes a wave division multiplexer (WDM) 320 disposed between a single optical fiber 310 and multiple optical fibers 330. In some implementations, between two and sixty-four fibers 330 extend from the WDM 320. In certain implementations, between four and thirty-two fibers 330 extend from the WDM 320. In certain implementations, between eight and twenty-four fibers 330 extend from the WDM 320. In an example, about sixteen fibers 330 extend from the WDM 320. In other implementations, any desired number of fibers 330 can extend from the WDM 320.

The WDM 320 demultiplexes optical signals carried by the single optical fiber 310 from the drop terminal 240 and routes the demultiplexed signals to the multiple optical fibers 330. Each optical fiber 330 carries an optical signal having a different wavelength (or wavelength band) from the optical signals carried on the other fibers 330. The WDM 320 also multiplexes optical signals carried by the multiple optical fibers 330 from the remote unit 260 and routes the multiplexed signal to the single optical fiber 310. In certain implementations, the WDM 320 includes a passive WDM. In an example, the WDM 320 is a standard WDM. In another example, the WDM 320 is a coarse wave divisional multiplexer (CWDM). In another implementation, the WDM 320 is a dense wave divisional multiplexer (DWDM), which can separate out more signals than a CWDM.

Certain example standard WDMs provide up to eight channels in the third transmission window (1530 to 1565 nm). Certain example DWDM use the same transmission window, but with denser channel spacing. For example, certain DWDMs can use forty channels at 100 GHz spacing or eighty channels with 50 GHz spacing. A CWDM uses increased channel spacing. Accordingly, eight channels on an example single fiber CWDM can use the entire frequency band between second and third transmission window (1260 to 1360 nm and 1530 to 1565 nm).

In some implementations, the wave division multiplexer 320 of the cable arrangement 300 is sealed from the outside environment. For example, the wave division multiplexer 320 can be overmolded or otherwise enclosed in a protective closure or seal 340. In certain implementations, portions of the single optical fiber 310 and multiple optical fibers 330 also are included within the sealed enclosure 340. In certain implementations, the single fiber 310 and multiple fibers 330 are separately ruggedized (e.g., have hardened outer jackets, etc.).

A distal end of the single optical fiber 310 is terminated by an optical connector 315 to enable the distal end to be plugged into the empty port 245' at the drop terminal 240. Distal ends of the multiple optical fibers 330 also are terminated by optical connectors 335 to enable the distal ends to be plugged into ports at the remote unit 260. Non-limiting examples of optical connectors 315, 335 suitable for terminating the optical fibers 310, 330 include SC-connectors, LC-connectors, LX.5-connectors, ST-connectors, and FC-connectors. In certain implementations, the optical connectors 315, 335 terminating the optical fibers 310, 330 are hardened optical connectors. Non-limiting examples of hardened optical connectors are disclosed in U.S. Pat. Nos. 7,744,288 and 7,113,679, the disclosures of which are hereby incorporated herein by reference.

In some implementations, the multiple optical fibers 330 of the cable arrangement 300 can be plugged into ports (e.g., receive ports (Rx) and transmit ports (Tx)) of the dedicated equipment. For example, a DAS remote access unit 260, a security camera, and a small cell node may each have a receive port and a transmit port. In certain implementations, the optical signals passing through each port have a different wavelength or wavelength band than the optical signals passing through the other ports. In certain implementations, pairs of optical fibers 330 can be terminated at duplex optical connectors and plugged into corresponding receive and transmit ports. Each pair of ports (Rx, Tx) corresponds with a different provider (e.g., a mobile phone service provider) and/or different telecommunications standard (e.g., LTE, 4G, and 3G, such as GSM, CDMA, EDGE, UMTS, DECT, WiMAX).

For example, a first pair of fibers 330 can bi-directionally carry a signal corresponding to a first band for a first provider; a second pair of fibers 330 can bi-directionally carry a signal corresponding to a second band for the first provider; and a third pair of fibers 330 can bi-directionally carry a signal corresponding to a first band for a second provider. In other implementations, each individual fiber can be associated with a separate band and/or provider.

FIG. 6 illustrates another example cable arrangement 400 suitable for use in connecting a dedicated subscriber 260 (e.g., a remote unit, a security camera, etc.) to a drop terminal 240. The cable arrangement 400 includes a WDM 420 disposed between a single optical fiber 410 and multiple optical fibers 430. Each dedicated subscriber 260 is configured to receive optical signals of a wavelength (or series of wavelengths). Each WDM 420 is configured to allow only optical signals having a particular wavelength to pass through. Accordingly, in certain implementations, each dedicated subscriber 260 is associated with a different WDM 420 to filter out all but the relevant signals for the dedicated subscriber 260. Thus, each network may utilize a series of cable arrangements 400 where each cable arrangement 400 includes a WDM 420 configured for a specific wavelength that is different than the wavelength for which another WDM 420 in the cable series is configured.

In various implementations, the WDM 420 includes a passive WDM, a standard WDM, a CWDM, or a DWDM. The WDM 420 is disposed within an environmentally sealed closure 440 disposed along the cable 400. In some implementations, the closure 400 includes a hard/rigid enclosure (e.g., formed of metal or hard plastic). In other implementations, the WDM 420 is disposed within a soft/flexible enclosure (e.g., an overmold).

The WDM 420 demultiplexes optical signals carried by the single optical fiber 410 from the drop terminal 240 and routes the demultiplexed signals to the multiple optical fibers 430. Each optical fiber 430 carries an optical signal having a different wavelength (or wavelength band) from the optical signals carried on the other fibers 430. The WDM 420 also multiplexes optical signals carried by the multiple optical fibers 430 from the dedicated subscriber 260 and routes the multiplexed signal to the single optical fiber 410.

A distal end of the single optical fiber 410 is terminated by an optical connector 415 to enable the distal end to be plugged into the empty port 245' at the drop terminal 240. Distal ends of the multiple optical fibers 430 also are terminated by one or more optical connectors 435 to enable the distal ends to be plugged into one or more ports at the dedicated subscriber 260. In the example shown in FIG. 6, all of the fibers 430 are terminated by a multi-fiber connector (e.g., an HMFOC connector, an MPO connector, etc.). Non-limiting examples of hardened multi-fiber optical connectors are disclosed in U.S. Publication No. 2014/0321813, the disclosure of which is hereby incorporated herein by reference. In other examples, the fibers 430 can be paired and routed to respective duplex connectors.

FIG. 7 illustrates another example cable arrangement 450 suitable for use in connecting a dedicated subscriber (e.g., a remote unit) 260 to a drop terminal 240. The cable arrangement 450 includes a WDM 420 disposed between a single optical fiber 410 and another single optical fibers 430'. Ends of the optical fibers 410, 430' distal from the WDM 420 are terminated by respective single-fiber optical connectors (e.g., DLX connectors, LC connectors, SC connectors, etc.). In various implementations, the WDM 420 includes a passive WDM, a standard WDM, a CWDM, or a DWDM. The WDM 420 is disposed within an environmentally sealed closure 440 disposed along the cable 400.

The cable arrangement 450 can be used in time multiplexing systems. For example, a transmit signal can be carried over the cable arrangement 450 during a first time period and a receive signal can be carried over the cable arrangement 450 during a second time period that does not overlap the first time period. Accordingly, only a single optical fiber is needed to carry all signals for a dedicated subscriber 260.

FIG. 8 illustrates another example cable arrangement 470 extending between a first optical connector 415 and a second optical connector 475. A single optical fiber 410 extends along the cable arrangement 470 between the connectors 415, 475. A WDM 420 is disposed at the second optical connector 475. For example, the WDM 420 can be mounted within a housing of the second optical connector 475. In various implementations, the WDM 420 includes a passive WDM, a standard WDM, a CWDM, or a DWDM.

The WDM 420 demultiplexes optical signals carried by the single optical fiber 410 from the drop terminal 240 and routes the demultiplexed signals to the optical fiber end faces 478 of the second optical connector 475. Each optical fiber end face 478 carries an optical signal having a different wavelength (or wavelength band) from the optical signals carried on the other end faces 478. The WDM 420 also multiplexes optical signals received at the optical fibers end faces 478 from the dedicated subscriber 260 and routes the multiplexed signal to the single optical fiber 410.

In other implementations, a respective WDM 420 can be disposed within each dedicated subscriber 260. Accordingly, standard optical patchcords can be routed between the drop terminals 240 and the dedicated subscribers 260.

Figure 9:
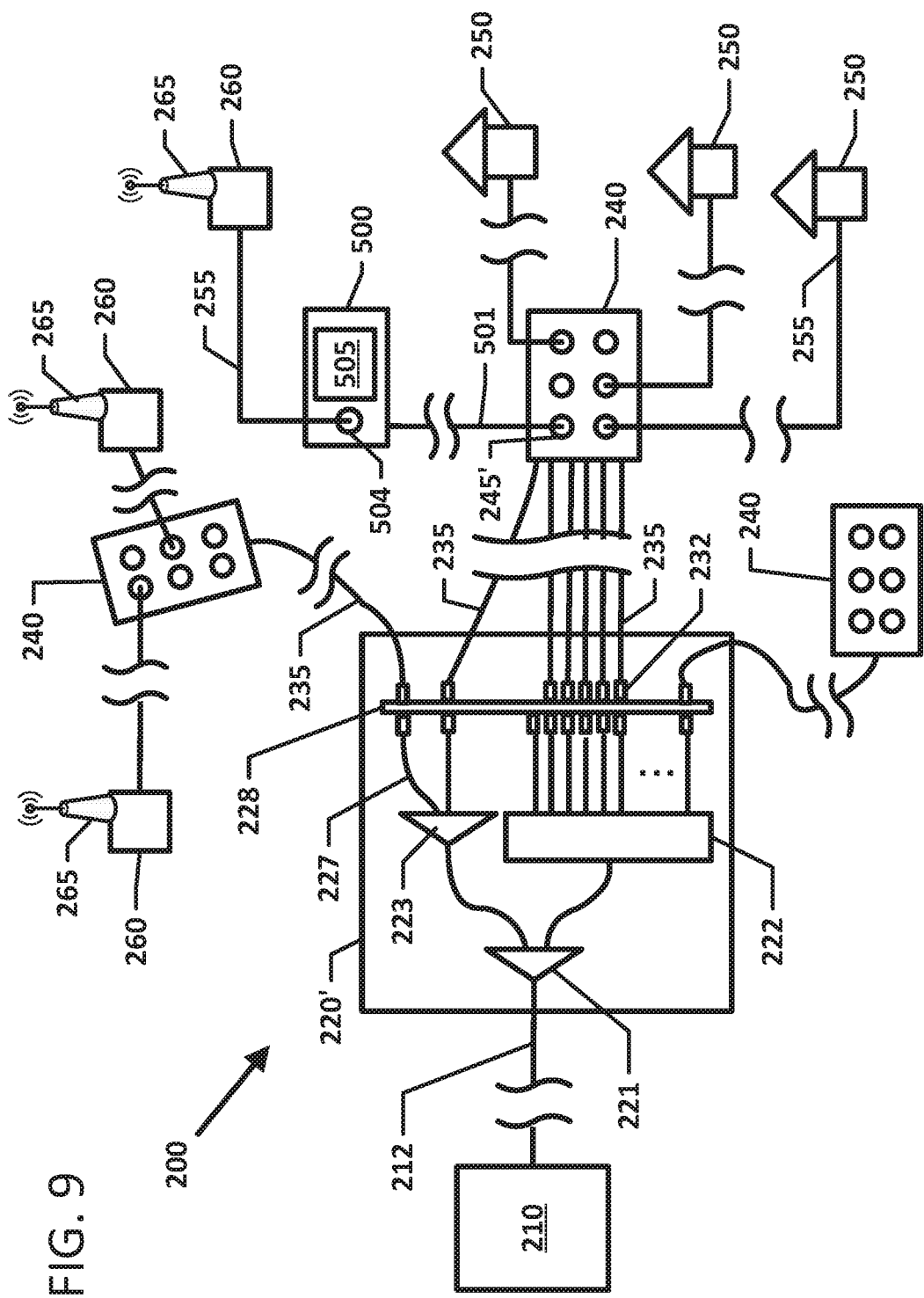
FIG. 9 is a schematic diagram of an FTTP network including an alternative FDH, a drop terminal, and a remote unit, and a first example implementation of an intermediate multiservice terminal.
Figure 10:
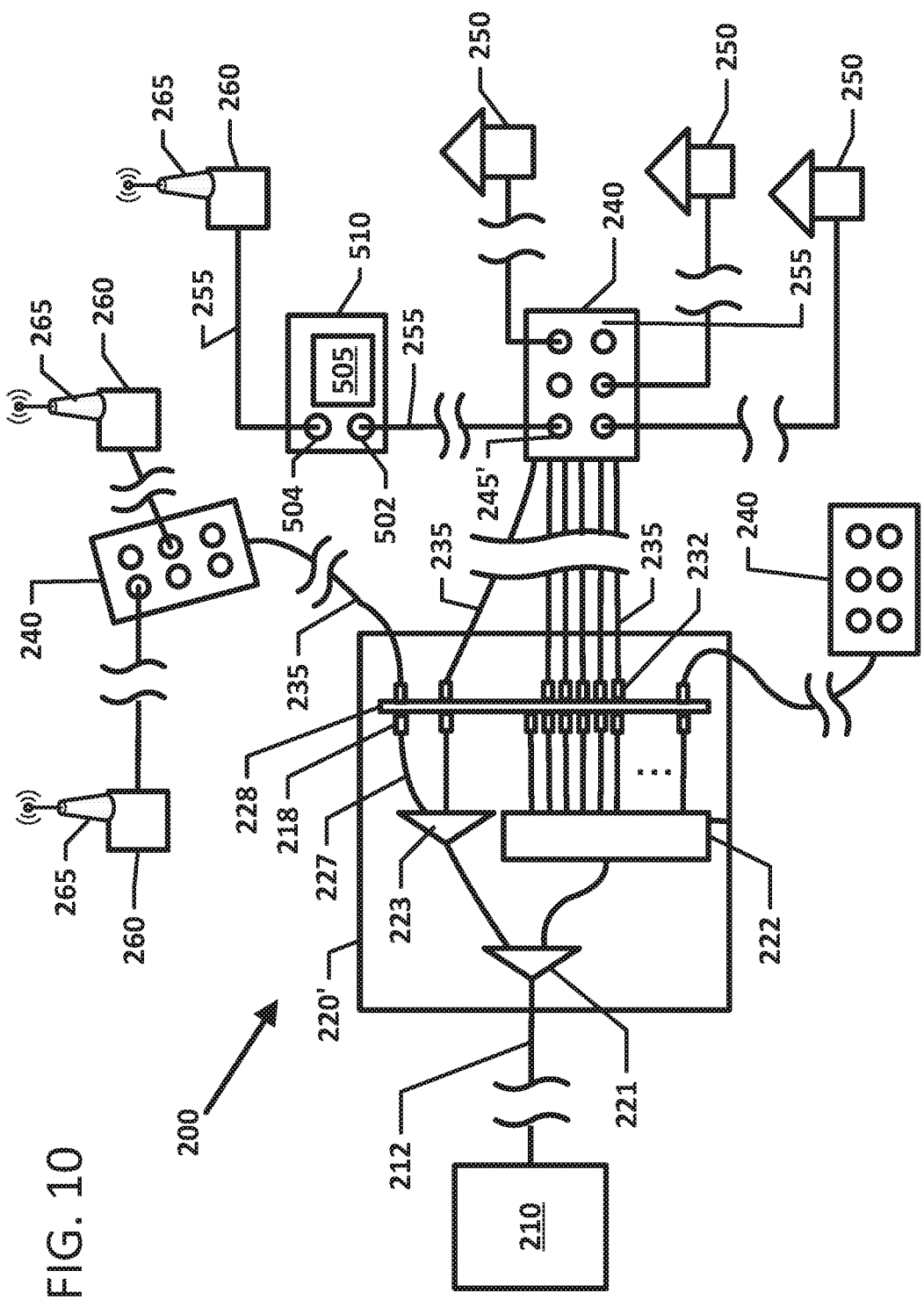
FIG. 10 is a schematic diagram of the FTTP network of FIG. 9 except the first intermediate multiservice terminal has been replaced with a second example implementation of an intermediate multiservice terminal.

FIGS. 9 and 10 illustrate using an intermediate multiservice terminal 500, 510 to connect a dedicated subscriber 260 (e.g., a remote unit, a security camera, etc.) to a drop terminal 240. The intermediate multiservice terminal 500, 510 includes a housing enclosing a WDM 505. In some implementations, the intermediate multiservice terminal 500 includes an input tether 501 having a connectorized end. In such implementations, the input tether 501 can be plugged into a port 245' of the drop terminal 240. In other implementations, the intermediate multiservice terminal 510 defines an input port 502 (e.g., a ruggedized input port). In such implementations, a patchcord 255 can be routed between the output port 245' of the drop terminal 240 and the input port 502 of the intermediate multiservice terminal 510.

The intermediate multiservice terminal 500, 510 defines one or more output ports 504 (e.g., ruggedized output ports). One or more patchcords 255 can be routed between the output ports 504 of the intermediate multiservice terminal 500, 510 and the dedicated subscriber 260. In certain implementations, each output port 504 receives optical signals of a particular wavelength from the WDM 500, 510. In such examples, each output port 504 is configured to receive a connectorized end of a single optical fiber. In other implementations, each output port 504 is a duplex output port that is configured to receive a duplex optical connector. In still other implementations, each output port 504 is configured to receive a multi-fiber connector (e.g., an HMFOC, an MPO, etc.).

An alternative FDH 220' also is shown in FIGS. 9 and 10. Such an FDH 220' can be utilized when optical signals intended for the dedicated subscribers (e.g., DAS network, security camera network, small cell network, etc.) are carried by the same optical fiber 212 as the optical signals intended for network subscribers 250. The dedicated optical signals are joined onto the optical fiber 212 upstream of the FDH 220' (e.g., at a central office 210). The alternative FDH 220' includes a WDM 221 that receives optical signals carried by the optical fiber 212. The WDM 221 separates out the optical signals intended for the dedicated subscribers and the optical signals intended for the subscribers 250.

The optical signals intended for the general subscribers 250 are carried from the WDM 221 to the optical power splitter 222 and split onto splitter pigtails 225. The splitter pigtails 225 can be utilized as discussed above with reference to FIGS. 2 and 3. The optical signals intended for the dedicated subscriber are carried from the WDM 221 to a second optical power splitter 223. Connectorized splitter pigtails 227 carry the split optical signals from the second optical power splitter 223 to the termination field 228. In certain implementations, additional WDMs are disposed upstream of the FDH 220' as discussed herein to separate out the optical signals intended for a specific dedicated subscriber (e.g., a specific remote unit) 260.

In certain implementations, the second optical power splitter 223 has a lower split ratio than the optical power splitter 222. In certain implementations, the optical power splitter 222 has a split ratio of at least double the split ratio of the second optical power splitter 223. In certain implementations, the optical power splitter 222 has a split ratio of more than double the split ratio of the second optical power splitter 223. In certain implementations, the optical power splitter 222 has a split ratio of no less than quadruple the split ratio of the second optical power splitter 223. In an example, the second optical power splitter 223 has a split ratio of 1 to 4 while the optical power splitter 222 has a split ratio of 1 to 32.

Figure 11:
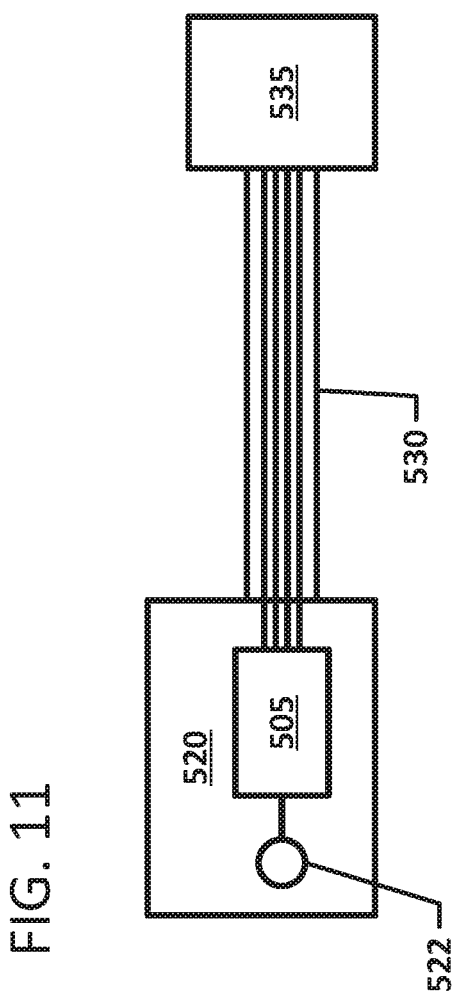
FIG. 11 is a schematic diagram of a third example implementation of an intermediate multiservice terminal.

FIG. 11 illustrates an alternative intermediate multiservice terminal 520 that also holds a WDM 505. The WDM 505 receives input from an input port 522 (e.g., a ruggedized input port). For example, a patchcord 255 can be routed between the drop terminal 240 and the input port 522 of the intermediate multiservice terminal 520. The WDM 505 separates by wavelength the optical signals carried to the input port 522. The WDM 505 separates the optical signals onto a plurality of optical fibers of a tether 530. The tether 530 extends outwardly from a housing of the intermediate multiservice terminal 520. A distal end of the tether 530 is terminated at an optical connector 535 (e.g., an HMFOC, an MPO, or other multi-fiber connector). The connectorized end 535 of the tether 530 can be plugged into a remote unit 260.

Figure 12:
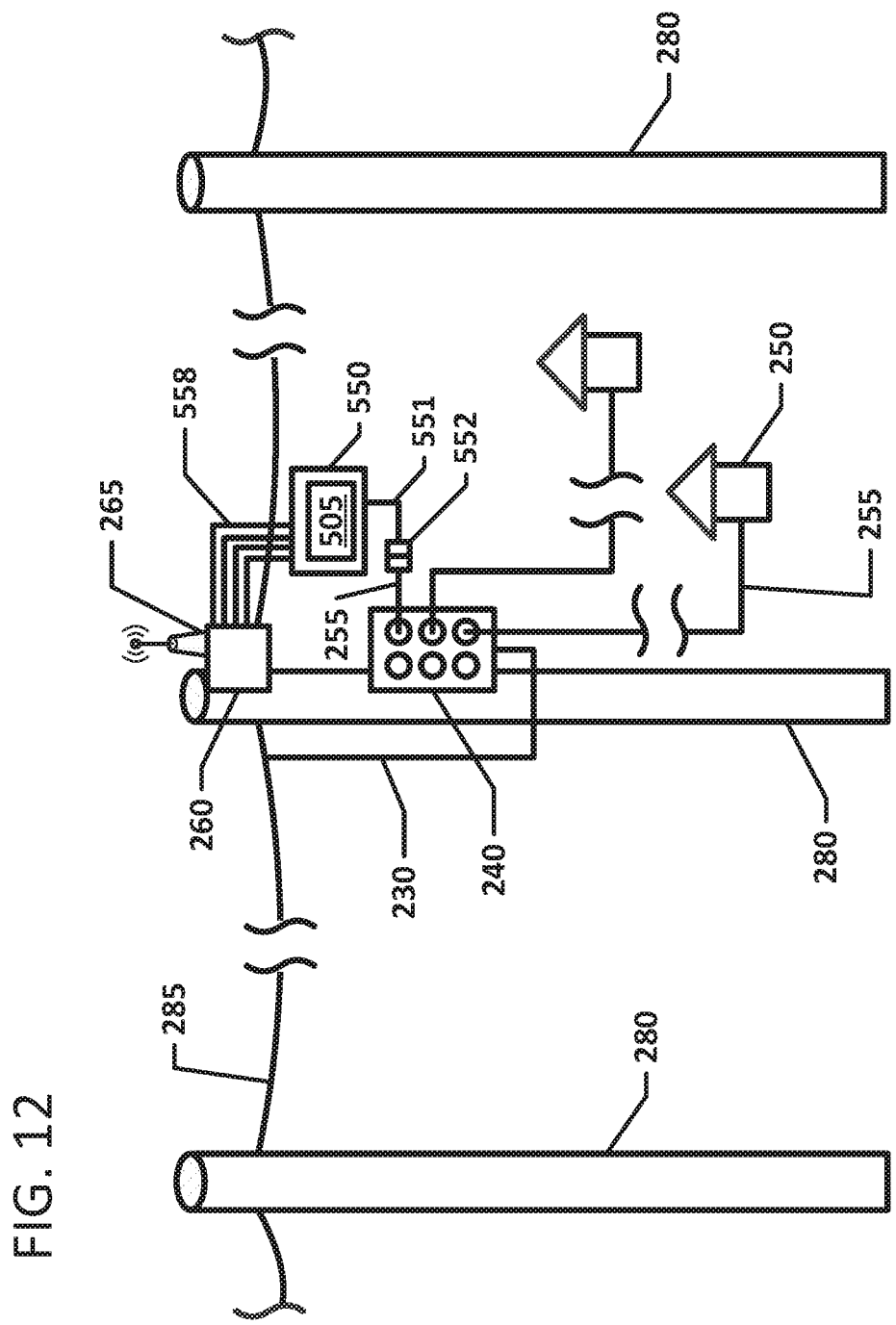
FIG. 12 illustrates a flexible service terminal cooperating with a patchcord to optically couple a drop terminal to a remote unit.

FIG. 12 illustrates a flexible service terminal 550 suitable for use in connecting a dedicated subscriber 260 (e.g., a remote unit, a security camera, etc.) to a drop terminal 240. The flexible service terminal 550 includes a flexible housing (e.g., an overmolded enclosure) surrounding a WDM 505. An input fiber 551 extends from the flexible housing in a first direction. A distal end of the input fiber 551 is terminated at an optical connector 552. Multiple optical fibers 558 extend from the flexible service terminal in another direction. Distal ends of the optical fibers 558 can be connectorized for receipt at ports of the remote unit 260.

Each flexible service terminal 550 includes a WDM 505 designed to pass along/filter a particular wavelength. Accordingly, the optical signals received from the drop terminal 240 include the optical signals for multiple dedicated subscribers 260 (e.g., multiple antenna nodes of the DAS network). However, each dedicated subscriber 260 is optically coupled to a particular WDM 505 (via the flexible service terminal) that filters/passes along the optical signals intended for that particular remote unit 260.

In certain implementations, the input fiber 551 is relatively short. For example, the input fiber 551 may be too short to reach the drop terminal 240 when the optical fibers 558 are plugged into the remote unit 260. In such implementations, a patchcord 255 can be routed from the output port 245' of the drop terminal 240 to the connectorized end 552 of the flexible service terminal 550. Accordingly, in certain implementations, the majority of the fiber extending between the drop terminal 240 and the remote unit 260 is not directly coupled to the WDM 505. The same configuration of patchcord 255 can be routed from each of the drop terminals 240 to one of the remote units 260. Only the relatively short flexible service terminals 550 are configured to a specific remote unit 260 (e.g., by including a WDM configured to filter the signal wavelength associated with the remote unit).

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cable arrangement comprising:
an optical cable extending between opposite first and second ends, the first end being terminated at one single-fiber plug connector, and the second end being terminated at one plug connector;
a sealed enclosure disposed along the optical cable between the first and second ends so that a first portion of the optical cable extends out of the sealed enclosure to the first end and a second portion of the optical cable extends out of the sealed enclosure to the second end; and
a wave division multiplexer disposed within the sealed enclosure, the wave division multiplexer being configured to multiplex optical signals carried over the optical cable to the first end and to demultiplex optical signals carried over the optical cable to the second end.

2. The cable arrangement of claim 1, wherein the one plug connector terminating the second end of the optical cable is a multi-fiber plug connector.

3. The cable arrangement of claim 2, wherein the multi-fiber plug connector includes an MPO connector.

4. The cable arrangement of claim 1, wherein the one plug connector terminating the second end of the optical cable is a single-fiber plug connector.

5. The cable arrangement of claim 4, wherein the single-fiber plug connector terminating the second end of the optical cable includes an SC connector.

6. The cable arrangement of claim 1, wherein the sealed enclosure includes a flexible enclosure.

7. The cable arrangement of claim 6, wherein the flexible enclosure is overmolded over the wave division multiplexer.

8. The cable arrangement of claim 1, wherein the sealed enclosure includes an intermediate multiservice terminal.

9. The cable arrangement of claim 1, wherein the one plug connector terminating the second end of the optical cable is ruggedized.

10. The cable arrangement of claim 1, wherein the one single-fiber plug connector includes an SC connector.

11. The cable arrangement of claim 1, wherein the one single-fiber plug connector is plugged into an output port of a drop terminal and the one plug connector terminating the second end of the optical cable is received at a dedicated subscriber.

12. An optical system comprising:
a signal source;
a plurality of subscribers including a plurality of network subscribers and a dedicated subscriber;
a fiber optic network extending between the signal source and the plurality of subscribers;
a drop terminal disposed along the fiber optic network, the drop terminal including a plurality of output ports;
a drop cable extending from a first of the plurality of output ports of the drop terminal to a first of the plurality of network subscribers to carry power split optical signals to the first network subscriber; and
a cable extending from a second of the plurality of output ports of the drop terminal to the dedicated subscriber to carry wavelength split optical signals to the dedicated subscriber, the cable extending fully between two plug connectors, wherein the cable or the two plug connectors include a wave division multiplexer configured to generate the wavelength split optical signals.

13. The optical system of claim 12, wherein a first of the two plug connectors is a single-fiber connector received at the second output port of the drop terminal.

14. The optical system of claim 13, wherein a second of the two plug connectors is a single-fiber connector received at the dedicated subscriber.

15. The optical system of claim 13, wherein a second of the two plug connectors is a multi-fiber connector received at the dedicated subscriber.

16. The optical system of claim 13, wherein the cable includes the wave division multiplexer disposed therealong.

17. The optical system of claim 16, wherein the wave division multiplexer is sealed within an enclosure disposed along the cable.

18. The optical system of claim 12, wherein a first of the two plug connectors includes the wave division multiplexer disposed therein.

19. The optical system of claim 18, wherein a second of the two plug connectors is a multi-fiber plug connector terminating multiple optical lines extending from the first plug connector.

20. The optical system of claim 18, wherein the first plug connector has a single-fiber interface.

* * * * *